March 11, 1924.
M. J. STEELE
DISPENSING CONTAINER
Filed May 31, 1922
1,486,200
2 Sheets-Sheet 1
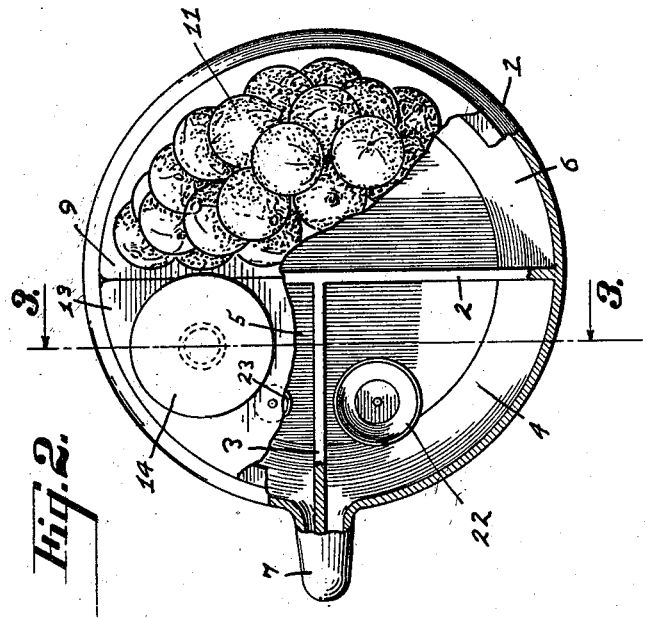
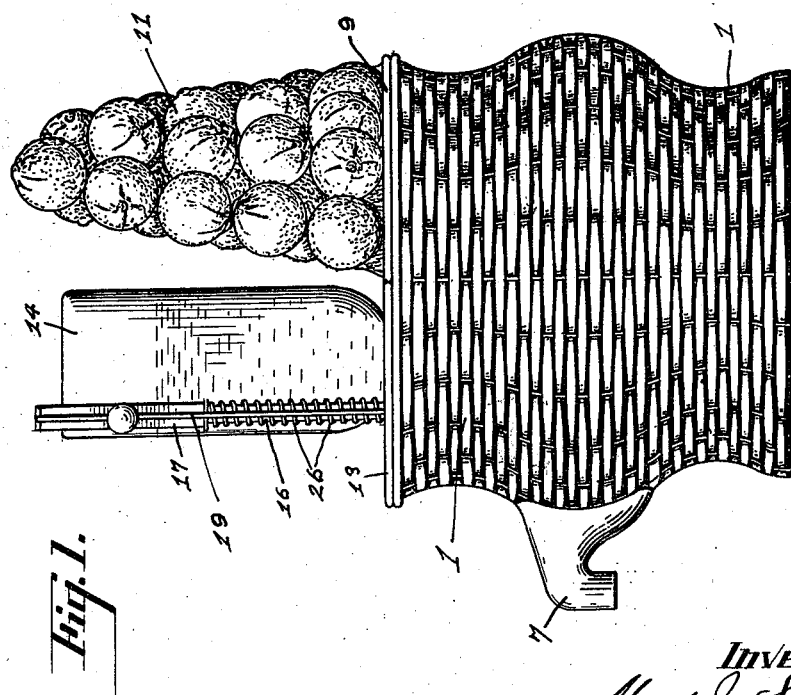
Inventor
Mary J. Steele
By Arthur L. Slee
Atty.

March 11, 1924.

M. J. STEELE

DISPENSING CONTAINER

Filed May 31, 1922    2 Sheets-Sheet 2

1,486,200

Inventor
Mary J. Steele
By Arthur L. Slee
Atty

Patented Mar. 11, 1924.

1,486,200

UNITED STATES PATENT OFFICE.

MARY J. STEELE, OF SAN FRANCISCO, CALIFORNIA.

DISPENSING CONTAINER.

Application filed May 31, 1922. Serial No. 564,898.

*To all whom it may concern:*

Be it known that I, MARY J. STEELE, a citizen of the United States, residing in the city and county of San Francisco and State of California, have invented a new and useful Improvement in a Dispensing Container, of which the following is a specification.

My invention relates to improvements in dispensing devices wherein dissimilar liquids contained within non-communicating compartments are simultaneously dispensed in predetermined quantities and proportion through a common spout.

The primary object of my invention is to provide an improved dispensing device.

Another object is to provide a device having improved means for dispensing dissimilar liquids simultaneously in predetermined proportion and quantity.

A further object is to provide improved means for storing and dispensing dissimilar liquids wherein the mixing of said liquids occurs only during the dispensing of the liquids, to prevent deterioration of the liquids.

A further object is to provide a device having improved means for dispensing and mixing of dissimilar liquids to facilitate the obtaining of a uniform mixture.

Another object is to provide improved means for adjusting the proportion of two dissimilar liquids simultaneously dispensed from separate compartments within a common container.

A still further object is to provide a device of improved construction which may be made to present a particularly attractive appearance such as will attract trade.

I accomplish these and other objects by means of the device disclosed in the drawings forming a part of the present specification wherein like characters of reference are used to designate similar parts throughout said specification and drawings and in which:

Fig. 1 is a side elevation of my improved dispensing container.

Fig. 2 is a broken plan view, partly in section, of the device as shown in Fig. 1.

Figure 4:
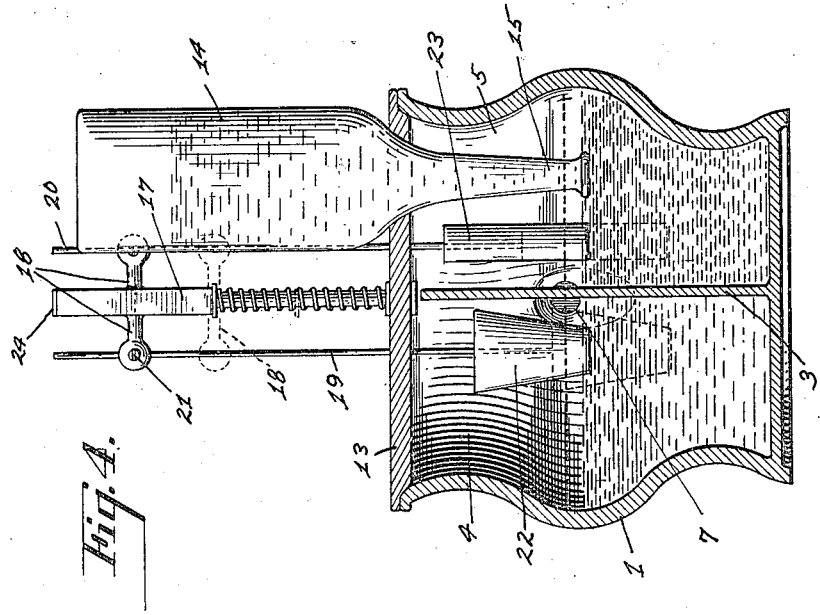
Fig. 4 is a vertical section taken upon the line 3—3 of Fig. 2 in the direction indicated.
Figure 3:
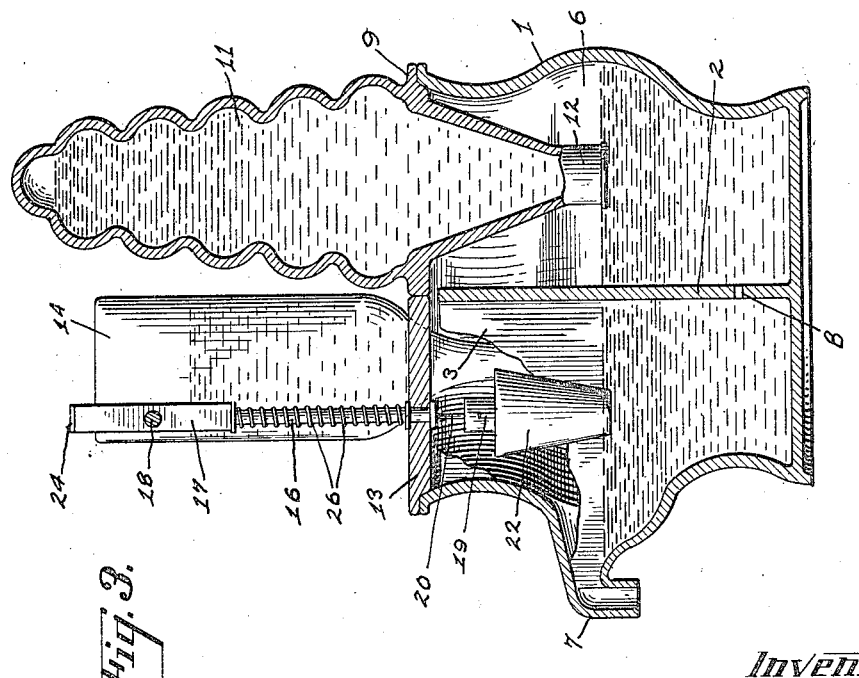
Fig. 3 is a vertical section of the device as shown in Fig. 1.

Referring to the drawings the numeral 1 is used to designate in general a container having a partition 2 and 3 formed therein to form a pair of non-communicating dispensing compartments 4 and 5 and a supply compartment 6. A spout 7 is formed adjacent the partition 3 and having openings upon each side of said partition 3 to form a common vent from the compartments 4 and 5. The supply compartment 6 communicates with only one of the dispensing compartments through an aperture 8.

A cover portion 9 is shaped to cover the supply compartment 6, said cover portion being provided with a reservoir 11 adapted to receive a quantity of a liquid to be dispensed. A neck 12 extends downwardly from the reservoir into the compartment 6, the liquid flowing from the reservoir into the compartment 6 and thence into the dispensing compartment communicating therewith through the aperture 8 until the liquid within the dispensing and supply compartments reaches the level of the lower end of the neck at which point the level of the liquid is maintained in the well known manner. The level so maintained is arranged to be immediately below the outlet opening for a purpose hereinafter more fully described.

A cover portion 13 is fitted over the dispensing compartments 4 and 5, said cover being provided with a reservoir 14 having a neck 15 extending into the dispensing compartment not communicating with the supply compartment, which dispensing compartment is designated by the numeral 5 in the drawings.

A guide 16 is secured upon the cover portion 13 and arranged to receive a member 17 mounted for longitudinal movement therealong.

Extensions 18 are formed upon each side of the slidable member 17, said extensions being bored to receive the upper ends of rods 19 and 20 adjustably secured thereto by any suitable means such as screws 21. The lower ends of the rods 19 and 20 extend downwardly through the cover portion into the compartments 4 and 5 respectively.

Displacing elements 22 and 23 are secured upon the lower ends of the rods 19 and 20 within the compartments 4 and 5 in such manner as to be moved downwardly into the liquids within the compartments when the rods are depressed by a downward movement of the member 17 along the guide 16. The upward movement of the member 17 is limited by means of a flange 24 secured upon the top of the guide 16, the member 17 being normally maintained in its uppermost position by means of a spring 26 mounted upon the guide 16 between the cover portion 13 and the member 17. The normal position of the displacing elements is adjusted by moving the rods 19 and 20 through the extensions 18, each rod and its displacing element being independently secured at the desired setting by means of the screws 21. In practice it is preferable to set the displacing elements in such positions that their lower ends will be in contact with or slightly immersed in the liquids within the compartments, in this manner avoiding splashing of the liquids when the displacing elements are moved downwardly thereinto.

My invention is particularly adapted for use at soda fountains for the dispensing of beverages and the like compounded from dissimilar liquids which it is desired to mix immediately before serving. To illustrate the operation and utility of my invention I will describe it in connection with the compounding and serving of orangeade. In this connection it is to be noted that pure orange juice when undiluted may be kept for longer periods of time without deterioration than when diluted with water. It is therefore desirable that the orange juice and water be retained separately and mixed only as used. To accomplish this I have divided the single container into non-communicating dispensing compartments. The compartment 5 is partially filled with pure orange juice supplied from the reservoir 14, the level of the liquid being maintained at a point immediately below the opening into the spout as above described. The other dispensing compartment 4 and the supply compartment 6 are filled with water to a similar level, water being supplied from the reservoir 11 into the compartment 6 and from there into the compartment 4 through the aperture 8. The compartment 4 combining with the supply compartment 6 and the reservoir 11 permits of the storage of a much greater quantity of water than of orange juice.

When it is desired to dispense a portion of orangeade the slidable member is depressed and the displacing elements forced downwardly into the liquids within their respective compartments by the rods 19 and 20. As the displacing elements are moved into the liquids a corresponding displacement of the liquid occurs and the level of the liquid within each compartment is raised. The size of the displacing elements is designed to cause the level of the liquid to rise above the outlet openings into the spout, thus when the displacing elements are lowered into the liquid the level of the liquid will rise above the outlet openings and a portion of the liquid from each dispensing compartment overflow through the spout, the liquids being dispensed together through the common spout.

The displacing elements 22 and 23 are arranged to be independently adjusted to vary the amount of displacement occasioned when the slidable member 17 is depressed and thereby varying the quantity of either liquid to be dispensed. Thus, the displacing elements are preferably arranged to each normally be positioned with the lower edge in contact or slightly submerged in the liquid to prevent splashing when depressed, and the sizes of the elements arranged in such proportion as to cause displacement and dispensing of the liquids in the desired proportion. However, if it is desired to increase the proportion of one liquid to the other, the proportion may be varied by raising the element within the compartment from which it is desired to dispense the lessened quantity, thus decreasing the distance the element will move into the liquid and hence similarly decreasing the displacement and quantity of liquid displaced at each operation.

The container is preferably molded from porcelain or similar material adapted to present a neat and attractive appearance. The cover portion and reservoir 11 are also preferably made of similar material, the reservoir being molded integrally with the cover portion 9, and designed to present an attractive appearance, such as will attract trade. Thus, in the drawings I have illustrated the reservoir as designed to present the outward appearance of a stack of oranges which serves to attract attention and advertise the character of the beverage contained therein. The reservoir 14 is preferably made of transparent glass in order to display the undiluted liquid contained therein.

The supply compartment 6 also serves as a receptacle for ice for cooling the beverage if desired.

From the above description it will be readily apparent that the precise form and arrangement of the elements of my invention may be modified in a great number of ways to adapt the device for use with different characters of beverages and the like. I, therefore, do not restrict myself to the precise details disclosed, but wish to avail myself of all such modifications as may fall within the scope of the appended claims.

Having thus described my invention what I claim as new and desire to secure by Letters Patent is:

1. A dispensing device comprising a container having a plurality of compartments; means for maintaining a liquid at constant level within each compartment; a spout communicating in common with said plurality of compartments; displacing means slidably mounted within each compartment; and means for moving the displacing means into the liquids contained within the compartments to raise the level of said liquids within their respective compartments whereby a portion of the liquids from each compartment may be simultaneously dispensed through the common spout.

2. A dispensing device comprising a container having a plurality of compartments; means for maintaining a liquid at constant level within each compartment; a spout communicating in common with said plurality of compartments; displacing means slidably mounted within each compartment; means for moving the displacing means into the liquids contained within the compartments whereby a portion of the liquids from each compartment may be simultaneously dispensed through the common spout; and means for independently adjusting the displacing means within each compartment to vary the quantity of liquid dispensed therefrom at each operation of the displacing means.

3. A dispensing device comprising a container having a pair of non-communicating compartments each adapted to receive a quantity of liquid; a spout communicating in common with the compartments; means for maintaining said liquids at constant levels within their respective compartment; a displacing element slidably mounted in each compartment; and means for moving said elements simultaneously to displace a portion of the liquid in the compartments and raise the level of the liquid therein whereby a predetermined quantity of the liquids may be dispensed simultaneously through the spout.

4. A dispensing device comprising a container having a pair of non-communicating compartments each adapted to receive a quantity of liquid; a spout communicating in common with the compartments; means for maintaining said liquids at constant levels within their respective compartments; a displacing element slidably mounted in each compartment; means for moving said elements simultaneously to displace a portion of the liquid in the compartments and raise the level of the liquid therein whereby a predetermined quantity of the liquids may be dispensed simultaneously through the spout; and means for adjusting the displacing elements to vary the quantity of liquid dispensed from each compartment at each operation of the displacing elements.

5. A dispensing device comprising a container having a pair of non-communicating dispensing compartments adapted to receive dissimilar liquids; a supply compartment formed within the container and communicating with one of the dispensing compartments; means for maintaining liquid at a constant level within the supply compartment and the dispensing compartment communicating therewith; means for maintaining another liquid at a constant level within the other compartment; a spout communicating in common with the dispensing compartments; a displacing member slidably mounted within each dispensing compartment; means for moving said displacing member simultaneously within their respective compartment to displace a portion of the liquid therein and raise the level of the liquid within the compartments whereby a portion of said liquid is caused to overflow from each compartment through the common spout; and means for independently adjusting the displacement caused by each displacing element at each operation thereof.

6. A dispensing device comprising a container having a pair of non-communicating dispensing compartments each adapted to receive a quantity of liquid; a spout communicating in common with said compartments; a cover portion arranged to fit over compartments; a guide secured upon the cover; a slidable member mounted upon said guide; a displacing element mounted within each compartment; a rod secured upon each displacing member and slidably mounted through the cover, said rods being connected to and actuated by the slidable member whereby the displacing elements may be moved to displace liquid simultaneously through the common spout from the dispensing compartments.

7. A dispensing device comprising a container having a pair of non-communicating dispensing compartments each adapted to receive a quantity of liquid; a spout communicating in common with said compartments; a cover portion arranged to fit over compartments; a guide secured upon the cover; a slidable member mounted upon said guide; a displacing element mounted within each compartment; a rod secured upon each displacing member and slidably mounted through the cover, said rods being connected to and actuated by the slidable member whereby the displacing elements may be moved to displace liquid simultaneously through the common spout from the dispensing compartments; and means for maintaining the liquid within each compartment at a constant level.

8. A dispensing device comprising a container having a pair of non-communicating dispensing compartments; a spout communicating in common with said compartments; a supply compartment communicating with one of the dispensing compartments; a cover portion arranged to cover the dispensing compartments; a separately removable cover portion arranged to cover the supply compartment; a reservoir mounted upon the second mentioned cover portion, said reservoir having a neck arranged to extend downwardly into the supply compartment whereby liquid supplied from the reservoir is maintained at a constant level within the supply compartment and the dispensing compartment communicating therewith; a reservoir mounted upon the other cover portion and arranged to supply liquid and maintain the same at a constant level within the other dispensing compartment; a guide secured upon the cover above the dispensing compartments; a slidable member mounted upon the guide; rods adjustably secured to said slidable member and arranged to extend into the dispensing compartments; displacing elements secured upon the rods within the compartments, said elements being arranged to be moved simultaneously into the liquids within the compartments by movement of the sliding member and the rods whereby the levels of the liquids are raised and a portion of said liquids caused to overflow through the common spout.

In witness whereof I hereunto set my signature.

MARY J. STEELE.